July 6, 1948.  D. W. NORWOOD  2,444,464
DEVICE FOR USE IN DETERMINING
PHOTOGRAPHIC EXPOSURES
Filed Feb. 8, 1947  3 Sheets-Sheet 2
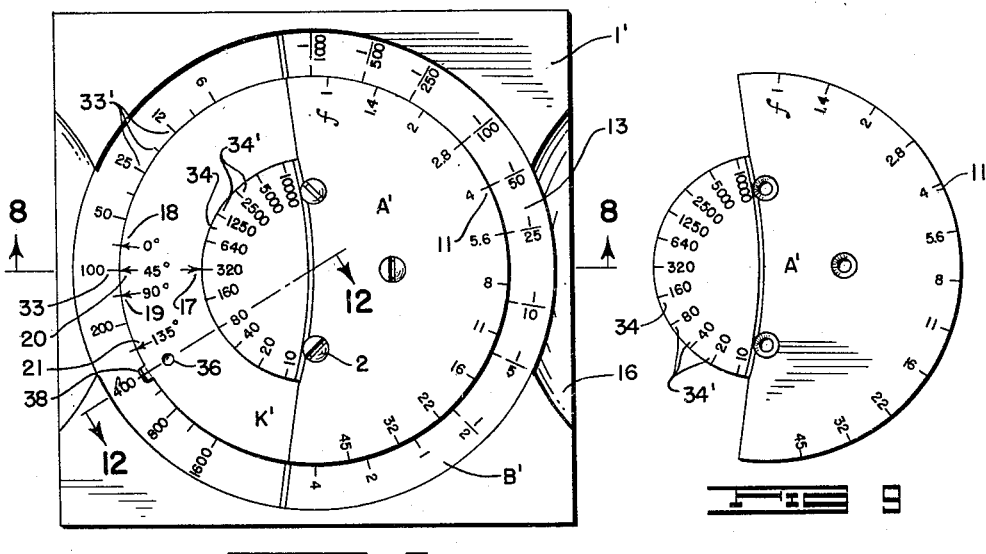
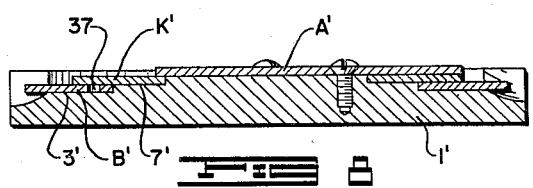
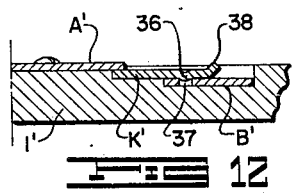
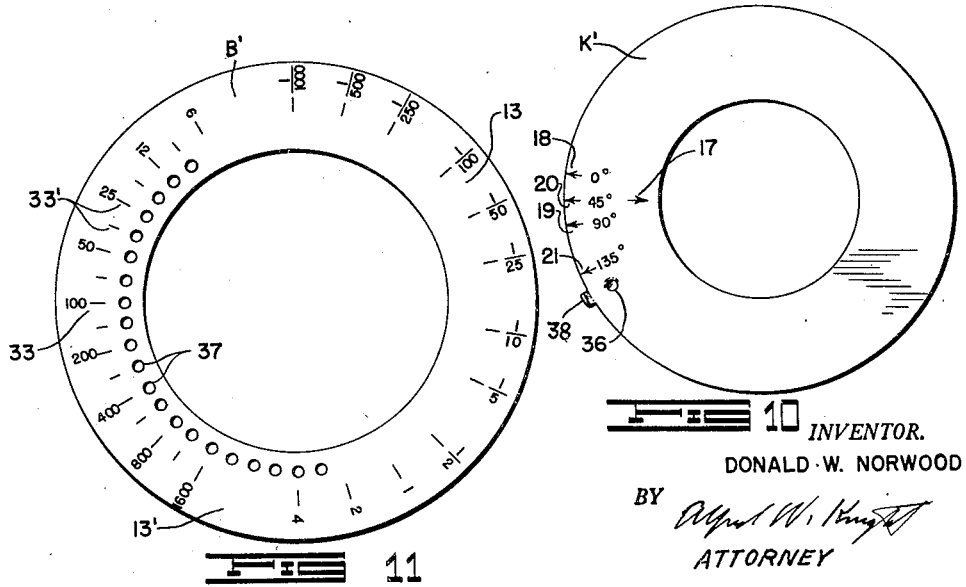
INVENTOR.
DONALD W. NORWOOD
BY
ATTORNEY July 6, 1948.  D. W. NORWOOD  2,444,464
DEVICE FOR USE IN DETERMINING
PHOTOGRAPHIC EXPOSURES
Filed Feb. 8, 1947  3 Sheets-Sheet 3
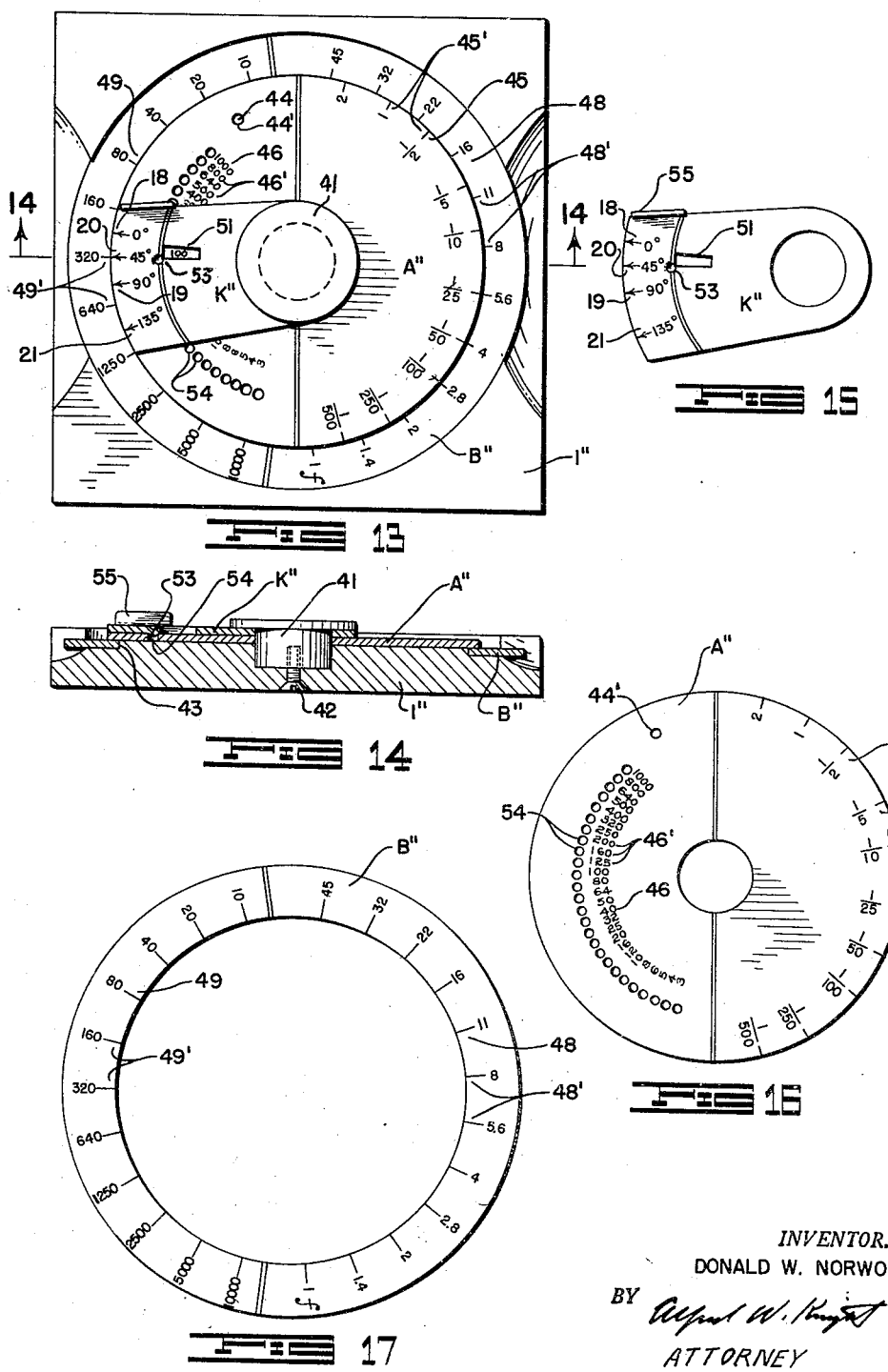
INVENTOR.
DONALD W. NORWOOD
BY
ATTORNEY Patented July 6, 1948

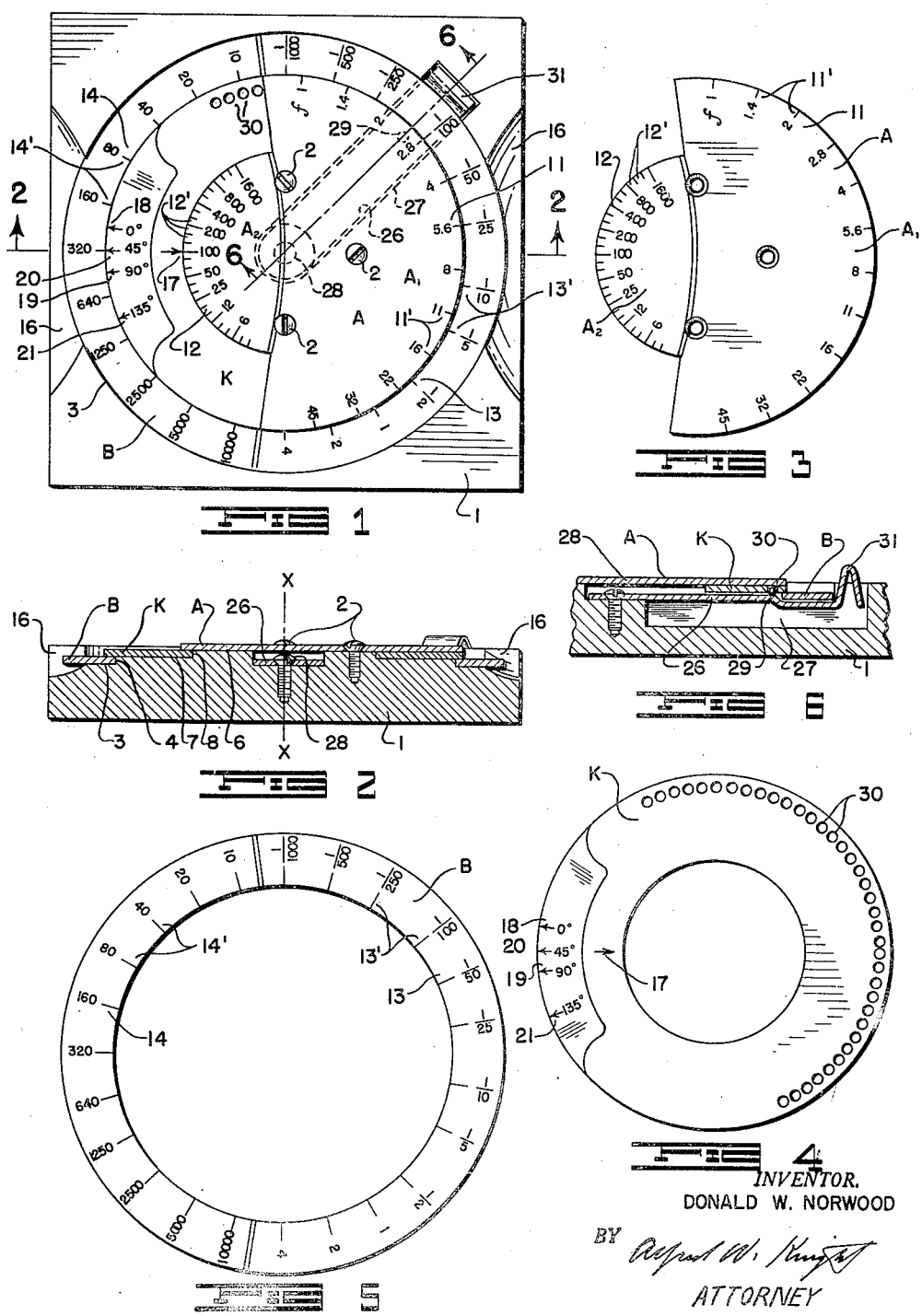

2,444,464

UNITED STATES PATENT OFFICE 2,444,464

DEVICE FOR USE IN DETERMINING PHOTOGRAPHIC EXPOSURES

Donald W. Norwood, Pasadena, Calif.

Application February 8, 1947, Serial No. 727,338

3 Claims. (Cl. 235—64.7)

This invention relates to the photographic art, and pertains particularly to a device which enables the rapid and exact calculation of the required photographic exposure under varied lighting conditions encountered in ordinary use. The device is intended to be used in conjunction with a light intensity measuring device adapted to measure the light intensity incident upon the photographic subject (rather than the intensity of the light reflected from the subject), the data obtained from the light-intensity measuring device being directly utilized in the ascertainment of the desired result, for example, the proper values of lens aperture and shutter speed for a given condition of film speed and lighting.

The proper appraisal of the photographic effectiveness of the illumination of a particular subject has always presented difficulties which result in the user of any photographic exposure-estimating device having to make a mental correction of the value indicated by such device in order to compensate for some condition which the device itself cannot be depended upon to compensate. For example, in the use of the reflected light meter, an assumption is made that the average scene reflects a certain percentage of the incident light; if the scene departs from this certain reflectance, the user must compensate for the departure by a mental compensation of the result indicated by the device. This mental compensation relies upon the judgment of the user, and is subject to considerable error. As a general rule, a fairly good result may be obtained where "black-and-white" film material is being employed, as a result of the latitude such film has for exposure, but where the so-called "natural-color" films are employed, a much closer determination of the optimum exposure must be attained in order that good color rendition is obtained.

I have observed that a very close determination of the proper photographic exposure may be had by measurement of the value of the main light falling upon the subject, i. e., the light constituting the "key" light for the subject, and utilizing that value with reference to the angle that the direction of such light makes with the camera axis to determine the "effective" illumination. This latter feature makes it possible to utilize the "key" light illumination as though it were the entire illumination, insofar as determination of the photographic exposure is concerned. This requires the use of a so-called "incident-light" type of exposure meter, and the proper application of the values obtained, in the ensuing computation of the photographic exposure.

The device of the present invention is adapted to provide proper computation of the correct exposure for a photographic subject when used with a "key" light measuring device of the incident-light type. One of the particular objects of the invention is to provide a device for the determination of photographic exposure which enables the user to consider the effective angle of the illumination provided by the "key" light.

A further object of the invention is to provide a device for the determination of photographic exposure, which is provided with the customary scales for the different factors to be considered, such as film sensitivity, light intensity, shutter time and lens aperture, together with indices for establishing the photographic exposure with reference to the angle of effective illumination provided by the "key" light which illuminates the photographic subject.

The device in accordance with this invention comprises a plurality of exposure factor scale members and a "key" light angle scale member interconnected for relative rotation about a common axis. The exposure factor scale members are provided with concentric scales indicative of different factors involved in determining photographic exposure, commonly referred to as "exposure factors." Each of these scales has a plurality of angularly spaced indicia representing different values of the corresponding exposure factor. In general, the exposure factors represented by the different scales include light intensity values as measured by an incident light meter, film sensitivity, lens aperture or "f-stop," and exposure time or "shutter time."

The "key" light angle scale member is provided with a reference mark that is positioned to register with the indicia of one of the exposure factor scales, and with a plurality of angularly spaced marks or indices that are positioned to register with the indicia of another of the exposure factor scales. These angularly spaced indices represent different values of "key" light angle, that is, the angular relationship between the camera axis and the direction of the main or "key" illumination at the position of the photographic subject.

The several scale members are adapted to be set, by relative rotation, to indicate the proper value of one of the exposure factors corresponding to different values of the other exposure factors and different values of the key light angle. In preferred embodiments of the invention, the device gives an indication of properly related values of lens aperture and shutter speed corresponding to given values of light intensity, film sensitivity, and key light angle. In order to facilitate the setting and manipulation of the scale members, I preferably provide releasable latch means whereby one of the scale members may be latched to another member in any desired relation thereto, so that the two members thus latched together operate as a unit relative to the remaining scale member or members.

The key light angle indices are so located angularly with respect to the reference mark on the key light angle scale member as to modify the indications of one exposure factor (corresponding to given values of the other factors) in accordance with variations in the key light angle, when the corresponding key light angle index is set to register with any one of the indicia of the coacting exposure factor scale.

The above and other features of the invention will be brought out in or will be apparent from the ensuing description of preferred embodiments thereof, as illustrated in the accompanying drawings, in which:

Fig. 1 is a face view of one embodiment of the device, with the dials set for the solution of a given problem;

Fig. 2 is a sectional view on line 2—2 in Fig. 1;

Figs. 3, 4 and 5 are face views of three separate scale members of the device shown in Figs. 1 and 2;

Fig. 6 is a fragmentary section on line 6—6 in Fig. 1;

Fig. 7 is a face view of another form of device according to the invention;

Fig. 8 is a sectional view on line 8—8 in Fig. 7;

Figs. 9, 10 and 11 are face views of three separate scale members of the device shown in Figs. 7 and 8;

Fig. 12 is a fragmentary section on line 12—12 in Fig. 7;

Fig. 13 is a face view of another embodiment of the invention;

Fig. 14 is a sectional view on line 14—14 in Fig. 13; and

Figs. 15, 16 and 17 are face views of three separate scale members of the device shown in Figs. 13 and 14.

The form of device shown in Figs. 1 through 6 comprises three scale members indicated at A, K and B, interconnected for relative rotation about a common axis indicated at X—X in Fig. 2. The scale members are shown as mounted and interconnected for relative rotation by means of a base member 1 to which the uppermost scale member A is secured by screws 2. The base member 1 is shown as provided with an annular groove or recess 3 in which the ring-shaped lowermost scale member B is rotatably disposed with its inner peripheral edge rotatably engaging the shoulder 4 at the inner periphery of recess 3, said shoulder serving to center the scale member B about the axis X—X while permitting free rotation thereof.

Between the shoulder 4 and the central portion 6 to which scale member A is secured, the base 1 is provided with another annular recess 7 of less depth than recess 3, in which the ring-shaped key light angle scale member K is rotatably mounted and centered about the axis X—X by shoulder 8 in a manner comparable to the mounting of scale member B as described above.

The outer portion of scale member K overlaps the inner portion of scale member B to retain the latter in position within the recess 3, while the outer portion of scale member A overlaps the inner portion of scale member K to retain it within the recess 7.

The scale members A and B are the exposure factor scale members in this form of the device. The uppermost scale member A comprises a substantially semi-circular portion $A_1$ which is shown as being of substantially the same radius as scale member K, and a substantially semi-circular portion $A_2$ of smaller radius, whereby approximately half the circumferential extent of the intermediate scale member K is exposed to view, as may be seen in Fig. 1. The portion $A_1$ is provided with a lens aperture scale indicated generally at 11, having a plurality of angularly spaced indicia 11′ in the form of printed marks and associated numbers representing the different values of lens aperture or "f-stop," said aperture values increasing in a counter-clockwise direction (it being understood that a decrease in the "f-stop" number represents an increase in aperture value). The indicia 11′ are arranged peripherally of the portion $A^1$ of this scale member and are shown as representing lens aperture values from f.1 to f.45.

The portion $A_2$ of this scale member is provided with a film sensitivity scale 12 having a plurality of angularly spaced indicia 12′ arranged along the periphery thereof and comprising printed marks and associated numbers representing different values of film sensitivity according to any desired scale or system of measurement. The scale I have illustrated is based upon the "Film exposure index" and the "American Standard speed numbers," which are identical in value and are sponsored by the American Standards Association, rather than the older "Weston speed" or "G.-E speed" scales. As illustrated in Fig. 3, this scale runs from a film sensitivity of 4 to 1600, with the values increasing in a clockwise direction.

The lowermost scale member B is provided with a shutter time scale 13 which occupies approximately one-half the circumference thereof and comprises a plurality of angularly spaced indicia 13′ in the form of printed marks and associated numbers representing different values of shutter time, increasing in a clockwise direction, from $\frac{1}{1000}$ of a second up to four seconds. The indicia 13′ are located adjacent the inner periphery of scale member B, in a position to register with the lens aperture indicia 11′ of scale member A, as illustrated in Fig. 1.

The scale member B is also provided, in the remaining portion of the circumference thereof, with a light intensity scale 14 comprising a plurality of angularly spaced indicia 14′ in the form of printed marks and associated numbers representing different values of light intensity as indicated by the incident-light exposure meter with which the device is to be used. I preferably utilize a light scale graduated in "foot-candles," arranged so that equal intervals indicate progressively increased light values according to a geometric progression. Thus, the indicia 14′ are shown as representing light values from 10 to 10,000 foot-candles, with the value of light intensity increasing in a counter-clockwise direction.

To facilitate manual rotation of scale member B, the base 1 may be notched or cut away at at least one position, and preferably at two opposite sides thereof, as indicated at 16, whereby the edge portion of said member may be engaged by a finger at either of these positions for effecting rotation thereof.

The key light angle scale member K, which is located between scale members A and B, is provided with a reference mark 17, located adjacent the inner periphery thereof in position to register with the indicia 12' of the film sensitivity scale on scale member A. Said scale member K is also provided with a plurality of angularly spaced indices representing different values of "key" light angle and located along the outer periphery thereof in position to register with the indicia 14' of the light intensity scale on scale member B. The key light angle indices are so positioned as to be useful in setting the device for different effective angles of the "key" light which are to be considered in arriving at the proper photographic exposure. The effective illumination angle, as above-described, is the angle between the direction of the light-source (the sun, for example, when used exteriorly, or a strong artificial light, when used indoors) and the photographic axis, measured from the position of the subject. The subject illumination resulting from the location of the light-source very close to the camera axis, i. e., with the sun right behind the camera, produces what is known as "front" lighting, and is the most effective photographically. This lighting may be considered as "0°" effective illumination angle. This "0°" effective illumination angle permits a minimum setting of the camera exposure controls for a given light intensity, and the key light angle index 18 (marked "0") is employed for setting the exposure calculating device for this condition. If the "key" light is directed upon the subject at an angle of 90° to the camera axis, the photographic exposure should be increased 100%, and for this reason the key light angle index 19 (marked "90°") is displaced from the index 18 in a counter-clockwise direction an angular amount equal to the angular spacing of one photographic stop on the scale 11, (as, for example, the angular spacing between f.2.8 and f.4).

If the effective angle of illumination is about 45°, values midway between the values for "0°" and "90°" effective angle are required. The key light angle index 20 for the "45°" illumination angle is thus placed midway between the indices 18 and 19. Similarly, in case of "back" lighting, illumination at an angle of 135° to the subject-camera axis requires double the exposure required for the 90° illumination, and the "135°" key light angle index 21 is spaced counterclockwise from the index 19 by an angle equal to one full stop on the scale 11. It will be appreciated that if the effective angle of the illumination is not exactly at "0," "45" or "90" degree, etc., the estimated angle may be employed by approximating the setting of the scale members at any intermediate value, by eye, within an accuracy of less than ¼ stop, which is adequate even for "natural" color films.

It will be observed that scale member K may be rotated so as to bring the reference mark 17 into register with any one of the indicia 12' of the film sensitivity scale 12. In order to facilitate the setting and manipulation of the scale members I prefer to provide means for releasably securing or latching scale member K in any such position of adjustment, relative to the base 1 and the scale member A. For this purpose, I have shown a spring latch member 26 located in a radially extending groove 27 in the base member 1, said latch being secured centrally to said base member through the agency of a screw 28 and carrying a pin 29 adapted to engage in any one of a series of openings 30 in scale member K, said openings being spaced angularly to correspond with the angular spacing of the indicia of scale 12. The latch member 26 is shown as extending beyond the periphery of scale member B and provided at its outer end with an upstanding portion 31 adapted to be engaged by the finger of the user and depressed to disengage the pin 29 from any one of the openings 30, following which the scale member K may be rotated by manual engagement, to provide the desired setting of reference mark 17 with respect to scale 12. The latching member 26 may then be released to latch the scale member K in this position.

In Fig. 1, the scale member K is shown as set for a film sensitivity of 100. To make this adjustment, the latch pin 29 is disengaged as above described, member K is rotated to bring reference mark 17 into register with the number "100" of the film sensitivity scale 12, and latch pin 29 is then engaged with the corresponding opening 30.

Let it be assumed that the incident-light meter with which the device is used has given a reading of 320 foot-candles for the "key" light intensity, and that the key light angle is 45°. With the member K latched in the position described above, the scale member B is then rotated to bring the "320" graduation of the light intensity scale 14 into register with "45°" key light angle index mark 20 on scale member K, as indicated in Fig. 1, so as to indicate on scales 11 and 13 the proper exposure control settings for the above assumed conditions of film sensitivity, light intensity and key light angle. Thus, the proper value of lens aperture may be read on scale 11 opposite any desired value of shutter time on scale 13.

It will be seen that the indicated exposure control settings are, for example:

⅟₁₀₀ second at f.2.8, or
⅟₅₀ second at f.4, or
⅟₂₅ second at f.5.6, etc.

If the "key" light angle were, for example, 0° or 90°, the "320" mark on scale 14 would be set opposite the corresponding index mark 18 or 19 of the key light angle scale on member K, and the proper exposure control settings for either of these conditions would be indicated on scales 11 and 13, the proper aperture values being, respectively, one half-stop less or one half-stop greater than for the 45° key light angle, for each value of shutter time.

It will be obvious that the correlation between the angular spacings of the indicia of the several scales and the location of reference mark 17 relative to the key light angle indices 18 to 21 are such as to provide for similar modification of the indications of the photographic exposure in accordance with variations in the key light angle, for any other conditions of film sensitivity and light intensity, when the corresponding one of the light intensity indicia is set to register with the proper key light angle index. For example, if the measured value of light intensity were twice as great as assumed above, the "640" mark on scale 14 would be set opposite the corresponding key light angle index mark, and the indicated photographic exposure would in each case be half as in the first described example.

Various modifications can be made in the arrangement of the scales in the above described form of the invention. For example, the shutter time scale 13 and the light intensity scale 14 may be interchanged in position on the scale member B and reversed in direction of increasing values, with the shutter time scale coacting with the indices 18 to 21 of the key light angle scale on member K at the left side of Fig. 1, and the light intensity scale coacting with the lens aperture scale 11 of member A at the right side of Fig. 1. The operation of the device with this scale arrangement would be the same as described above except that, in the final setting, a selected value of shutter time would be set (by rotation of scale member B) opposite the proper key light angle index at the left side of Fig. 1, and the proper lens aperture value would be read opposite the measured value of light intensity at the right side of Fig. 1.

As another modification, the lens aperture scale 11 and light intensity scale 14 may be interchanged in position, without change in the direction of increasing values thereof. In that case, the operation would again be the same as described above with the scale arrangement shown in Figs. 1 to 6, except that in the final setting the scale member B would be rotated to set a selected shutter time value opposite the measured value of light intensity at the right side of Fig. 1, and the desired lens aperture value would be read opposite the proper key angle index at the left side of the device. Alternatively, a selected lens aperture value could be set opposite the key light angle index, and the proper shutter time could be read opposite the measured light intensity value.

As another alternative, the shutter time scale 13 could be substituted in place of the film sensitivity scale 12 on member A, with the values increasing in the same direction as shown, the film sensitivity scale 12 substituted in place of the light intensity scale 14 on member B and reversed in direction of increasing values, and the light intensity scale 14 substituted in place of the shutter time scale 13 on member B and reversed in direction of increasing values. With this scale arrangement, the scale member K may be rotated to set the reference mark 17 opposite a selected shutter time at the left side of Fig. 1, and latched in this position. Scale member B may then be rotated to set the film sensitivity value opposite the proper key light angle index at the left side of the device, and the proper lens aperture value may be read opposite the measured value of light intensity at the right side of the device.

Still another modification is to place the key light angle indices 18 to 21 adjacent the inner periphery of scale member K so as to register with the film sensitivity scale 12, and reverse the relative angular position of the key light angle index values, and place the reference mark 17 at the outer periphery of scale member K so as to register with the light intensity scale 14. In this case, scale member K would be rotated so as to set the proper key light angle index mark opposite the film sensitivity value on scale 12, and latched in that position. The user may then rotate scale member B to set the light intensity value on scale 14 opposite the reference mark 17, and read the lens aperture value for any given value of shutter time on the scales 11 and 13.

Various modifications can also be made in the construction of the device according to my invention. For example, the intermediate scale member K could be rigidly secured to the base 1 and the uppermost scale member A rotatably mounted thereon and provided with releasable latch means comparable to the latch means described above. With the various scales and the reference mark 17 located on the respective scale members in the same manner as shown in Figs. 1 to 6, the user would first rotate scale member A to bring the proper value of film sensitivity on scale 12 into register with the reference mark 17, and latch said scale member in this position relative to the member K. The operation would be otherwise the same as previously described, and it will be obvious that other scale arrangements comparable to those mentioned above may also be used with this modified construction.

Another possible variation is to adjustably latch two of the scale members together for concurrent rotation relative to the other scale member which may be secured to the base. An example of such a construction is shown in Figs. 7 through 12. The scale members A', K' and B' are generally similar to members A, K and B, scale member A' being similarly secured to a base member 1', and scale members B' and K' being similarly mounted in recesses 3' and 7' for rotation relative to member A', and being provided with interengaging releasable latch means.

The arrangement of the scales could be the same as in Fig. 1, but I have shown a modified scale arrangement in which a film sensitivity scale comparable to scale 12 of Fig. 1 but reversed in direction of increasing values is provided at the left side of scale member B' as indicated at 33 (in the position occupied by the light intensity scale 14 in Fig. 1), while a light intensity scale comparable to said scale 14 but reversed in direction of increasing values is provided on the smaller radius portion of scale member A' as indicated at 34 (in the position occupied by the film sensitivity scale 12 in Fig. 1).

The scale member K' is provided with reference mark 17 and key light angle indices 18, 19, 20 and 21 in the same manner as described above for the member K in Fig. 1, the mark 17 being in this case positioned to register with any one of the light intensity indicia 34' of scale 34, and the key light angle indices 18 to 21 being positioned to register selectively with any one of the film sensitivity indicia 33' of scale 33. The scale members A' and B' are provided, as before, with a lens aperture scale 11 and a shutter time scale 13 similar to the corresponding scales in Fig. 1.

The means for releasably latching together scale members K' and B' is shown as comprising a small, preferably somewhat rounded, downwardly projecting detent 36 on member K' adapted to engage any one of a plurality of coacting recesses or openings 37 in member B' located at intervals corresponding to the angular spacing between the film sensitivity indicia 33', there being one of said recesses or openings 37 in position for engagement by detent 36 when any one of the key light angle indices 18 to 21 is set to register with any one of the indicia 33'. The ring-shaped member B' extends inwardly beneath the member K' sufficiently to permit location of the recesses 37 at the proper position for engagement by detent 36.

It will be understood that in any one of the forms of device described herein, the several scale members may be made of thin metal or any other suitable material, and in this form of construction the member K' may be sufficiently thin and resiliently flexible to enable the detent 36 to pass readily into and out of engagement with successive recesses 37 upon manual rotation of one of the members B' or K' while the other is held against rotation as by manual pressure thereon, thus permitting relative rotation of said members to establish a given setting of film sensitivity and key light angle. To facilitate this operation, the member K' may be provided with a projecting tab 38 for manual engagement, and said tab is preferably located adjacent the detent 36 whereby a slight manual upward pressure may be applied against said tab to assist in releasing said detent from engagement with recesses 37. However, if both of the members K' and B' are left free to rotate, the engagement of said detent with a given recess is sufficient to cause said members to rotate together, relative to member A', upon manual rotation of one of them.

In the preferred method of utilizing this form of calculating device, the scale member B' is first rotated relative to scale member K', as described above, to bring the proper film sensitivity value on scale 33 into register with the desired one of the key light angle indices 18 to 21. Scale members B' and K' are then rotated together, as described above, to bring the reference mark 17 into register with the measured value of the "key" light on the light intensity scale 34, whereupon the proper photographic exposure, in terms of properly related values of lens aperture and shutter speed, may be read on scales 11 and 13.

The scale settings and indicated values of lens aperture and shutter speed shown in this case are the same as in Fig. 1.

It will be obvious that the positions of the various scales may also be interchanged in this form of the device, with due regard to the direction of increasing values thereof, in manners comparable to the modifications described in connection with the form of device shown in Fig. 1.

By way of example, one modification that may be made in the arrangement of the scales in this form of device, is to interchange the positions of the lens aperture scale 11 and the light intensity scale 34 on scale member A', and reverse the direction of increasing values in each of these scales. With this modified scale arrangement, the device may be operated in the same manner as described above for the scale arrangement shown in Fig. 7, except that in the final setting operation the scale members B' and K' are rotated together to set the reference mark 17 on member K' opposite a selected lens aperture value at the left side of Fig. 7, and the proper shutter time is then read on scale 13 opposite the measured value of light intensity at the right side of Fig. 7. Alternatively, a selected shutter time may be set opposite the measured value of light intensity at the right side of Fig. 7, and the corresponding lens aperture value may be read opposite the reference mark 17 at the left side of the device.

Another modified form of device according to this invention is shown in Figs. 13 through 17. This device comprises two exposure factor scale members A" and B" and the key light angle scale member K" mounted on a base member 1" and interconnected for relative rotation by means of a centrally located stud 41 secured to said base member by screw 42.

The base member is provided with an annular recess 43 in which the lowermost scale member B" is rotatably mounted in a manner comparable to the mounting of the member B in Fig. 1.

Scale member A" is formed as a disc overlying the central portion of the base member with the outer portion thereof overlapping the ring shaped scale member B" to retain the latter in the recess 43, scale member A" being secured to base 1", against rotation relative thereto, as by means of a pin 44 secured to said base and engaging suitably positioned opening 44' in said scale member.

Scale member K" is rotatably disposed above the scale member A" and the outer end thereof conforms substantially to the circumference of member A". Said scale member K" however is of limited circumferential extent so as to cover only a small portion of scale member A" to which it may be releasably latched as described hereinafter.

Scale member A" is shown as provided at the right side thereof with the shutter time scale 45 provided with indicia 45', said scale being comparable to the scale 13 in Fig. 1 but with the values of shutter time increasing in a counter-clockwise direction and covering a somewhat smaller range from 1/500 of a second to two seconds. This scale is located along the periphery of said scale member. At the opposite side, said scale member A" is provided with a film sensitivity scale 46 comprising a plurality of angularly spaced indicia 46' in the form of printed numbers representing different values of film sensitivity or "Film exposure index," increasing in a clockwise direction, from 3 to 1000. The indicia 46' are arranged in a circular row and positioned somewhat inwardly from the periphery of the scale member.

The scale member B" is provided at the right side with the lens aperture scale 48 having a plurality of angularly spaced indicia 48' in position to register with the shutter time indicia 45' on member A". This scale 48 is comparable to scale 11 in Fig. 1, but with the lens aperture values increasing in a clockwise direction. At the opposite side, said scale member B" is provided with a light intensity scale 49 having a plurality of indicia 49" in position to register with the key light angle indices at the outer end of scale member K", as described hereinafter. The scale 49 is similar to the light intensity scale 14 in Fig. 1.

The key light angle scale member K" is provided with a reference mark in the form of an opening 51 located inward from the periphery thereof at a position corresponding to the position of the film sensitivity indicia 46' and adapted to register with any one of said indicia upon rotation of said scale member K" to a position to permit the desired value of film sensitivity to be viewed through said opening and said scale member is also provided at its outer end with a plurality of angularly spaced indices 18, 19, 20 and 21 which are similar in location and spacing to the correspondingly numbered indices in Fig. 1. Said scale member K" is also provided with a small downwardly projecting detent 53 adapted to engage any one of a plurality of angularly spaced recesses or openings 54 in scale member A", said recesses corresponding in number and spacing to the indicia 46' of the film sensitivity scale 46. The scale member K" is also shown as provided with an upwardly projecting tab 55 to facilitate manual rotation thereof.

It will be evident that scale member K" may be rotated by manual engagement of said tab 55, to bring the opening 51 into register with any one of the film sensitivity indicia 46' on scale member A″, and the detent 53 will engage the corresponding recess 54 to latch these members together in this relative position with respect to each other.

In Fig. 13, the scale members K″ and A″ are shown as set, by relative rotation in the manner described above, for a film sensitivity of 100. The scale member B″ may then be rotated relative to members A″ and K″ to set the measured value of light intensity on scale 49 opposite the proper key light angle index on member K″, whereupon the proper value of lens aperture may be read on scale 48 opposite any desired value of shutter time on scale 45. The scale settings shown in Fig. 13 are identical with those in Fig. 1.

It will be evident from the above description that various modifications may also be made in the relative arrangement of the scales in this last-described form of the invention, with due regard to the relative angular positions of the indicia thereof and the direction of increasing values represented by said indicia.

In each of the forms of the invention shown and described herein, and with any of the described scale arrangements, it will be seen that the key light angle scale member is provided with a reference mark such as 17 or 51 positioned to register with the indicia of a coacting scale on one of the exposure factor scale members and is also provided with a plurality of angularly spaced indices, such as the marks 18 to 21, positioned to register with the indicia of a coacting scale on another exposure factor scale member, and that the key light angle indices are so located with respect to the reference mark as to modify the indicated value of one of the exposure factors corresponding to given values of the other factors, in accordance with variations in the key light angle, when the corresponding key light angle index is set to register with any of the indicia of the coacting scale on said other exposure factor scale member.

I claim:

1. In a device for calculating photographic exposure, the combination comprising: a plurality of exposure factor scale members and a key light angle scale member interconnected for relative rotation about a common axis; said exposure factor scale members being provided with concentric scales indicative of different exposure factors, including a scale indicative of intensity of the main or "key" illumination falling upon a photographic subject, each of said exposure factor scales having a plurality of angularly spaced indicia representing different values of the corresponding exposure factor; said key light angle scale member being provided with a reference mark positioned to register with the indicia of a coacting scale on one of said exposure factor scale members, and being also provided with a plurality of angularly spaced indices positioned to register with the indicia of a coacting scale of another of said exposure factor scale members and representing different angular relationships between the camera axis and the direction of the main or "key" illumination at the position of the photographic subject; said scale members being adapted to be set, by relative rotation, to indicate the proper value of one of said exposure factors corresponding to given values of the other exposure factors and given values of said angular relationship; and the indices on said key light angle scale member being so located with respect to said reference mark as to modify the indication of said one exposure factor in accordance with variations in said angular relationship, when the corresponding one of said indices is set to register with any of said indicia of said coacting scale on said other exposure factor scale member.

2. In a device for calculating photographic exposure, the combination comprising: a plurality of exposure factor scale members and a key light angle scale member interconnected for relative rotation about a common axis; said exposure factor scale members being provided with concentric scales indicative of the factors lens aperture, shutter time, film sensitivity, and light intensity, each of said exposure factor scales having a plurality of angularly spaced indicia representing different values of the corresponding factor; said key light angle scale member being provided with a reference mark positioned to register with the indicia of a coacting scale on one of said exposure factor scale members, and being also provided with a plurality of angularly spaced indices positioned to register with the indicia of a coacting scale on another of said exposure factor scale members and representing different angular relationships between the camera axis and the direction of the main or "key" illumination at the position of the photographic subject; said scale members being adapted to be set, by relative rotation, to indicate properly related values of lens aperture and shutter time corresponding to given values of film sensitivity, light intensity and said angular relationship; and the indices on said key light angle scale member being so located with respect to said reference mark as to modify the indications of related values of lens aperture and shutter time in accordance with variations in said angular relationship, when the corresponding one of said indices is set to register with any of said indicia of said coacting scale on said other exposure factor scale member.

3. In a device for calculating photographic exposure, the combination comprising: a plurality of exposure factor scale members and a key light angle scale member interconnected for relative rotation about a common axis; said exposure factor scale members being provided with concentric scales indicative of the factors lens aperture, shutter time, film sensitivity, and light intensity, each of said exposure factor scales having a plurality of angularly spaced indicia representing different values of the corresponding factor; said key light angle scale member being provided with a plurality of angularly spaced indices positioned to register with the indicia of the scale indicative of light intensity on one of said exposure factor scale members and representing different angular relationships between the camera axis and the direction of the main or "key" illumination at the position of the photographic subject, and being also provided with a reference mark positioned to register with the indicia of a coacting scale on another of said exposure factor scale members; said scale members being adapted to be set, by relative rotation, to indicate properly related values of lens aperture and shutter time corresponding to given values of film sensitivity, light intensity and said angular relationship; and the indices on said key light angle scale member being so located with respect to said reference mark as to modify the indications of related values of lens aperture and shutter time in accordance with variations in said angular relationship, when the corresponding one of said indices is set to register with any of said indicia of said scale indicative of light intensity.

DONALD W. NORWOOD.